Dec. 24, 1940.    J. J. RIZNYK    2,226,289
ROTARY MULTIPLE PLOW
Filed June 15, 1939
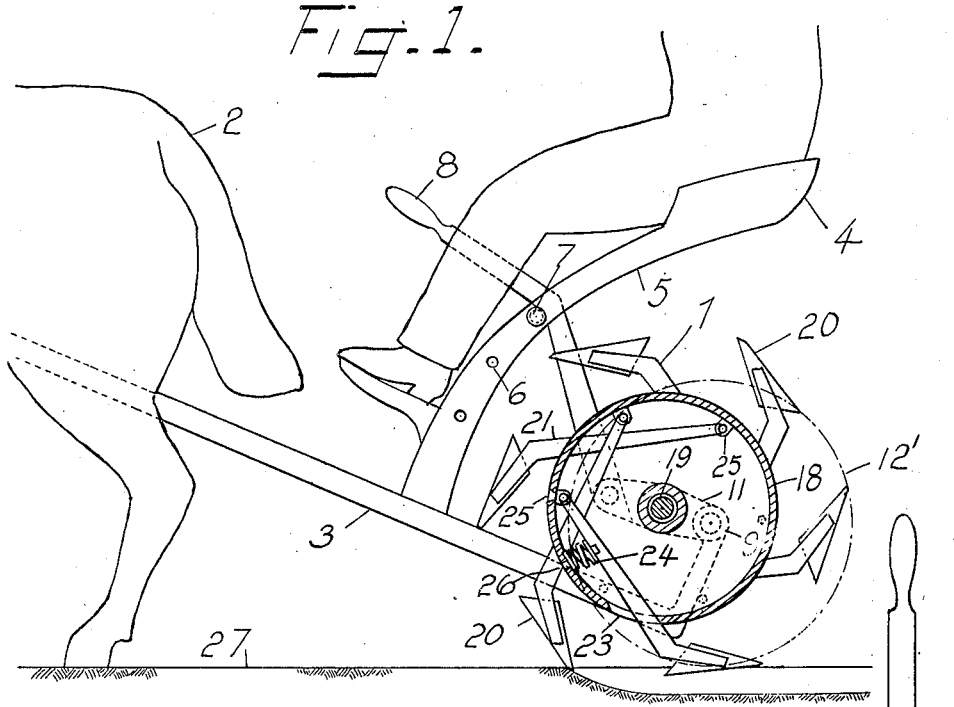
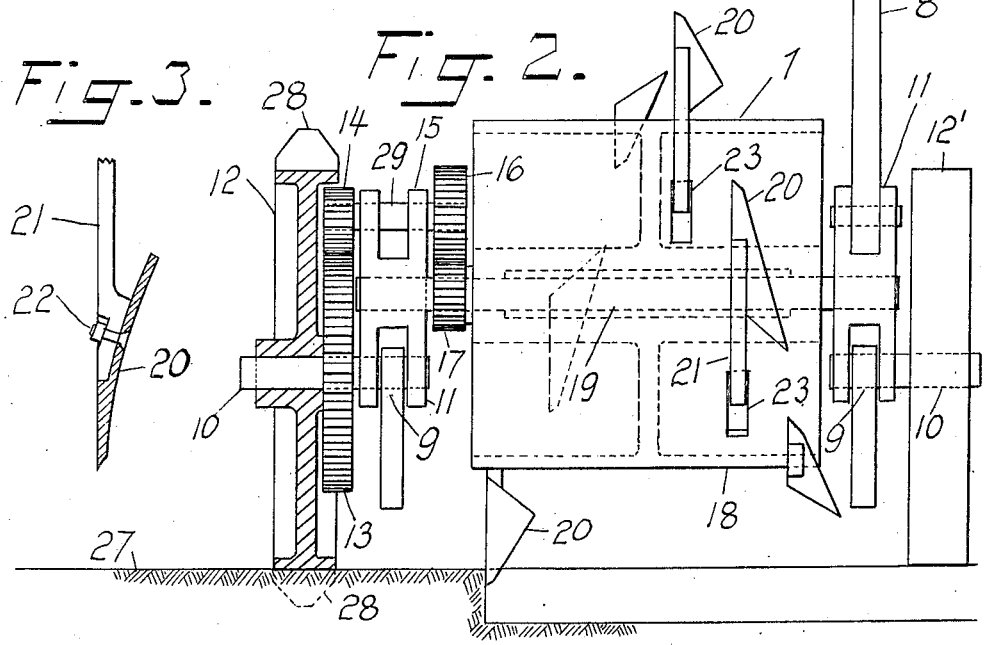
WITNESSES
INVENTOR
Joseph J. Riznyk Patented Dec. 24, 1940

2,226,289

UNITED STATES PATENT OFFICE 2,226,289

ROTARY MULTIPLE PLOW

Joseph J. Riznyk, Englishtown, N. J.

Application June 15, 1939, Serial No. 279,332

3 Claims. (Cl. 97—40)

My invention refers to a rotary multiple plow whereby a field may be plowed and harrowed in one operation and the invention specifically refers to a horse-drawn device in which the tractive power of one or several horses is utilized for its operation.

My preferred device provides a plurality of cutters which are attached to a rotary member by spring means that allow a substantial resilient motion between the several cutters and the rotary member so as to gradually take up a sudden cutting resistance, which frequently is set up by stones, roots or other obstructions contained in the field to be plowed.

The invention also provides means whereby an excessive obstruction resistance will bodily lift the rotary member and the cutters contained therein, so that the cutters may clear the encountered obstacle without stopping the operation.

In my invention, a series of cutters are arranged in a spiral formation so that they cut through the earth one at a time and thereby I have succeeded in reducing the power required for the operation of my device, so that only one horse is required to plow and cultivate a strip 18 inches wide and 8 inches deep.

Now therefore, as a hitherto unattainable desideratum has been achieved by a new combination of old elements and a new and useful result flows therefrom, I do not only lay claim to the apparatus shown, but I also claim the several steps necessary as part of my invention.

Finally by means of a lever arrangement I provide for the setting of the rotary member so that a predetermined cutting depth of plowing may be substantially maintained and the plowing may be made, say 4 inches deep for garden truck, 6 inches deep for corn and 8 inches deep for potatoes and so on.

In the drawing

Figure 1 is a side view of my preferred horse-drawn device and shows the details of construction of the rotary multiple plow.

Figure 2 is a rear view of my device and shows the general gearing and lever arrangements.

Figure 3 shows the detail of an individual cutter and its preferred attachment to a holding arm.

In the drawing where like reference characters denote corresponding parts, 1 represents the rotary multiple plow which is drawn by a horse 2 and operated by a driver as indicated on the drawing.

In the illustrated horse-drawn mechanism a plurality of projecting cutters 20 are assembled in the rotary member or drum 15, which is shown geared to one of the two wheels 12 and 12', with which the rotary plow is provided, so that the drum will rotate in the same direction as the vehicle wheels but many times faster around a carrying shaft 19. This shaft forms the center portion of a bail shaped drum support, which is pivoted in the hubs of the vehicle wheels by means of stub shafts 10, so that the drum at all times during plowing proper is suspended at a predetermined height above the ground and free to swing bodily upwards whenever an excessive plow resistance is encountered in the ground by the cutters.

The double harness shaft 3 to the ends of which the horse is hitched is provided with a driver's seat 4 and seat support 5, which I prefer to provide with several holes 6, adopted for the insertion of a stopper pin 7 in support of a lever 8 which is secured to the end of one of the forked castings 11.

It is to be noted that the positioning of the stopper pin 7 determines the clearance between the bail supported drum 15 and the ground and therefore also the depth of the plowing.

For reasons of gear clearance the ends of the harness shaft 3, which are attached to the plow are bent upwards in between bearings 9 with which the forked castings 11 are provided as shown in the drawing.

It is to be noted that the bail shaped drum support gives rigidity to my entire plowing device as it is composed of the following rigidly connected parts, viz., the two forked castings 11, the stub shafts 10 round which the vehicle wheels 12 and 12' turn and the drum shaft 19.

The bail shaped support rests in the wheel hubs and the weight of the drum gives sufficient downward leverage for the cutters to cut into and cut through the ground.

Should however a cutter meet an excessive resistance, the drum support will swing upwards sufficiently for the cutter to clear, whereupon the drum again presses the cutters into the earth to the predetermined plowing depth.

The device disclosed shows only one operating wheel 12, which is provided with holding cleats 28, but it is to be understood that the wheel 12' may also serve as an operating wheel, in which case the rotary drum should be split in two and each of the two drums should be separately geared to each of the two operating wheels.

It is to be noted that this latter arrangement will not prevent the turning around of the vehicle. The operating gearing of the drum is shown composed of a gear 13, which meshes with the small gear 14, and this latter gear is keyed to a shaft 29, which turns in the bearings with which one of the forked castings is provided. Gear 16 is also keyed to this shaft and this latter gear meshes with gear 17, which is firmly secured to the hub 18 of drum 15.

In order to attain a substantial resilient motion between the several cutters 20, and the drum 15, I prefer to provide the rim of the drum with a plurality of slots 23, which laterally steadies the holding arms 21, and the cutters are attached by bolts 22, and allow the arms to be substantially presed backwards against compression springs 24, with which each of the several cutter arms are provided.

To the rim of the drum 15 are eye lugs 25 attached and the rim is also provided with retaining holes 26 for compressor springs 24.

The operation is as follows:

The rotary plow is pulled forward by the horse and the traction wheel 12 turns together with the gear 13, which causes the drum 15 to turn about six times as fast as the traction wheel 12.

Now therefore, as there are six cutters attached to the drum each of the cutters will make a cut that conforms with the distance that the horse has pulled my plowing device, and therefore each cutter cuts a continuous swath as the vehicle is being pulled forward, but only one cutter at a time cuts through the field 27, as the cutters are spaced equally around the drum's periphery.

It is to be noted that the cutters of the speedily rotating drum are spirally arranged in the drum and therefore they will cause the top soil partly to be pressed down into the ground and partly to be sliced and fall down into a furrow made by the adjoining cutter.

Should an unyielding obstruction be met during the plowing operation, the cutter resistance will first cause the springs to compress whereupon the drum itself would be bodily lifted up and the shaft bail will swing upwards around its stub shafts and the vehicle will proceed with the cutters elevated until the obstruction is passed and the drum again would drop by its weight and the plowing continue.

It is to be noted that although my device has been described as a horse-drawn vehicle, the device is also adapted for tractor pulling.

Now therefore, I do not wish to be understood as limiting myself to the construction shown as it is evident that alterations and modifications may be made in the adaptation of my device for different purposes without departing from the scope and spirit of my invention.

I claim:

1. A rotary multiple plow comprising in combination a traction wheel, a bail shaped shaft hinged in wheel hubs, a drum rotating on the bail shaped shaft, a gear attached to the traction wheel, a gear attached to the drum, meshing gears for transmitting the rotary motion of the traction wheel to the drum so that the traction wheel and the drum turn in the same direction, cutter carrying arms pivotally attached to the rim of the drum, a series of guiding slots spirally arranged in the rim and spring means forcing the pivoted cutter arms forward against the ends of the slots, and means whereby the descent of the drum is stopped at a predetermined distance from the ground.

2. In a plowing device a rotary member, a plurality of resilient cutter means arranged in spiral formation in said member, a traction wheel, a gear attached to the traction wheel, a gear attached to the rotary member and meshing gears for transmitting the rotary motion of the traction wheel to the rotary member so that the wheel and the rotary member turn in the same direction and at a high speed so that only one cutter at a time cuts through the unplowed earth and a broad plow swath is left in the wake of said member and the top soil is partly pressed down by the impact of the cutter and sliced, partly to fall into a previously cut furrow.

3. In a plowing device, a rotary member, a bail shaped and hinged support for said member, a plurality of cutters arranged in said member, means for rotating said member at high speed, means to limit the descent of the rotary member to a certain height above the ground and means to permit the bodily elevation of the rotary member by the resistance of an unyielding obstacle.

JOSEPH J. RIZNYK.